Nov. 10, 1970   A. ROPPEL   3,539,253
PHOTOGRAPHIC CAMERA WITH A DETACHABLE HANDLE
Filed April 23, 1968   3 Sheets-Sheet 3
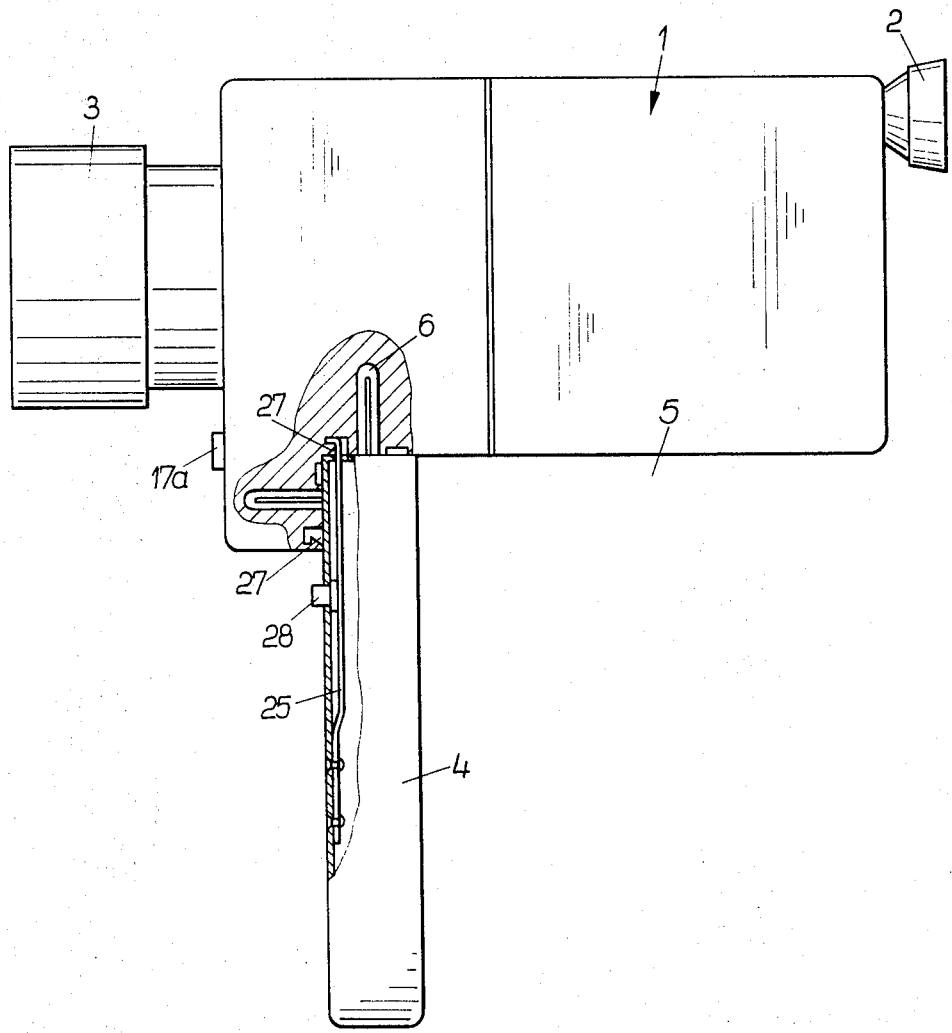

United States Patent Office 3,539,253
Patented Nov. 10, 1970

3,539,253
PHOTOGRAPHIC CAMERA WITH A DETACHABLE HANDLE
Alfred Roppel, Munich, Germany, assignor to Niezoldi & Kramer GmbH, Munich, Germany
Filed Apr. 23, 1968, Ser. No. 723,388
Claims priority, application Germany, Apr. 25, 1967, N 30,405
Int. Cl. G03b 17/00
U.S. Cl. 352—243  7 Claims

ABSTRACT OF THE DISCLOSURE

A hollow handle which contains a rechargeable storage cell can be attached to the housing of a motion picture camera in two different positions in the first of which it extends from the housing and can be grasped by hand when the camera is in use, and in the second of which its outline is complementary to that of the housing. The handle is provided with two prongs which are insertable into an outlet to recharge the cell and which also serve as a part of a coupling which can connect the handle to the housing. Two electrical terminals on the handle engage complementary terminals on the housing, at least when the handle is attached in the first position, whereby the cell can supply current to a motor which is mounted in the housing to drive the film transporting mechanism and the shutter.

BACKGROUND OF THE INVENTION

The present invention relates to photographic cameras in general, particularly to motion picture cameras. Still more particularly, the invention relates to improvements in photographic cameras of the type wherein the handle or pistol grip is detachable from the housing or body of the camera.

It is already known to provide a dovetailed connection between the housing and the handle of a motion picture camera. The handle accommodates one or more electric storage cells which can be recharged from a commercial outlet by way of a flexible cable. A drawback of such cameras is that the handle can only be connected in a single position and that the cable must be disconnected therefrom before the camera is put to use during exposure. Furthermore, the cable is likely to be lost or misplaced upon disconnection from the handle.

SUMMARY OF THE INVENTION

It is an object of the invention to provide a photographic camera with a removable handle which accommodates one or more rechargeable storage cells and a circuit which can be used for charging of the cell, and to construct and assemble the handle in such a way that the cell therein can be charged without resorting to a cable.

Another object of the invention is to provide a camera wherein the handle can be coupled to the housing in several positions.

A further object of the invention is to provide a camera wherein the parts which conduct current during recharging of a storage cell in the handle also perform additional important functions.

An auxiliary object of the invention is to provide a camera wherein the motor and/or other current-consuming units in its housing can receive current from the cell in the handle regardless of the position in which the handle is attached to the housing.

An additional object of my invention is to provide a camera wherein the handle can be attached in such position that it occupies little space when the camera is stored in a carrying case or the like.

The improved photographic camera comprises a housing or body which supports the lens and accommodates a supply of film, a shutter, a film transporting mechanism, a view finder and other essential components of the camera, a hollow handle, a pair of electrical terminals extending from the handle so that they may be inserted into a wall outlet when the handle is detached from the housing, at least one rechargeable storage cell in the handle and a plurality of coupling means provided in or on the housing and each adapted to receive the terminals in one of several positions of the handle with reference to the housing.

The housing may be provided with a recess which accommodates the major part of or the entire handle in a first (storing) position of the handle. In a second position, the handle extends from the housing, preferably downwardly and below the recess, so that it can be readily grasped by hand to support the housing when the camera is in use.

The handle is further provided with a second pair of terminals which convey electric current to one or more current-consuming units in the housing, at least when the handle is attached in the second position.

The novel features which are considered as characteristic for the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a similar side elevational view of the camera but showing the handle in operative position.

DESCRIPTION OF THE PREFERRED EMBODIMENTS

Figure 1:
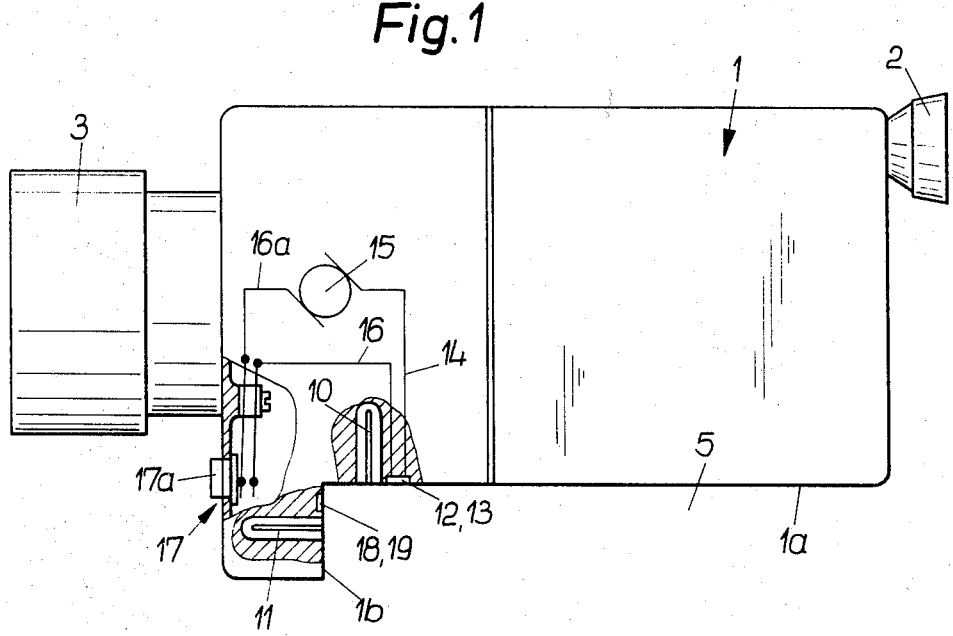
FIG. 1 is a side elevational view of the housing in a motion picture camera which embodies my invention, the handle being removed and a portion of the housing being shown in section.
Figure 2:
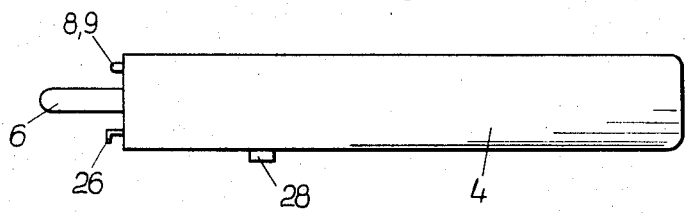
FIG. 2 is a side elevational view of the handle.

FIG. 1 illustrates the housing or body 1 of a motion picture camera. The front wall of the housing 1 carries a lens mount 3 and its rear wall supports the rear lens 2 of a view finder. The elongated bottom wall of the housing 1 is provided with a longitudinally extending recess 5 bonded by a longitudinally extending top surface 1a and a vertically or transversely extending front surface 1b. The latter is parallel or nearly parallel to the front and rear walls of the housing 1.

Figure 3:
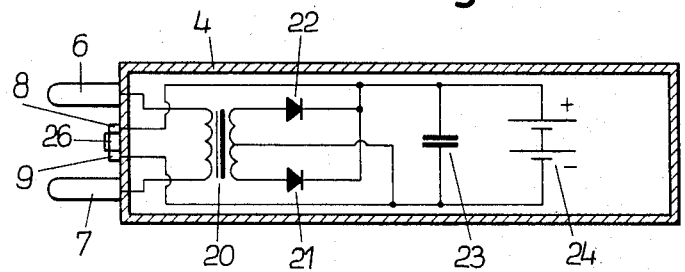
FIG. 3 is a schematic sectional view of the handle.
Figure 4:
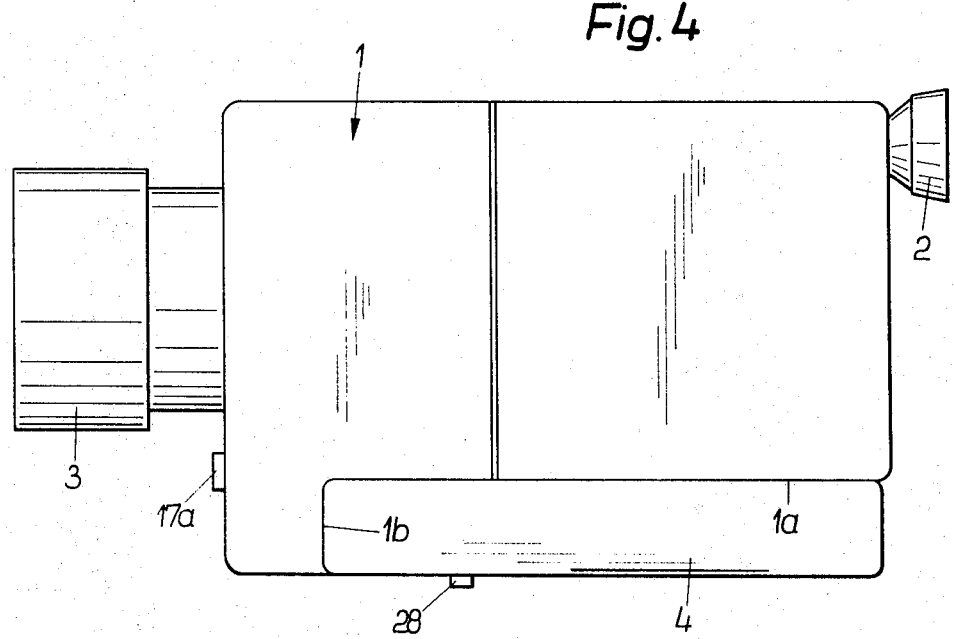
FIG. 4 is a side elevational view of the camera with the handle shown in storing position.

The improved handle 4 is shown in FIGS. 2 to 5. This handle is hollow and its dimensions equal or approximate the dimensions of the recess 5. The interior of the handle 4 accommodates one or more rechargeable electric storage cells 24 and an electric charging circuit (FIG. 3). The handle 4 is further provided with two elongated parallel electric terminals 6, 7 (hereinafter called prongs) which extend beyond its front face and can be inserted into a conventional wall outlet (not shown) to recharge the cell 24. Furthermore, the prongs 6, 7 constitute the male elements of a coupling which includes two pairs of female coupling elements 10, 11, respectively, provided in cavities of the surfaces 1a and 1b. Each of the coupling elements 10, 11 is an elastic socket which can yield in response to insertion of the respective prongs 6, 7 and thereupon hold the prongs with a certain force which can be readily overcome by the operator when the handle 4 is to be separated from the housing 1. When the prongs 6, 7 are inserted into the sockets 11 in the surface 1b of the housing 1, the handle 4 assumes a storing position which is shown in FIG. 4 and in which the handle substantially fills the recess 5, i.e., it is then accommodated within the confines of the housing 1 and occupies little room in a carrying case. When the prongs 6, 7 are inserted into the sockets 10 in the surface 1a of the housing 1 (FIG. 5), the handle 4 extends in a direction substantially at right angles to the direction shown in FIG. 4. The handle 4 then resembles a customary pistol grip and can be grasped by hand to support the housing 1 when the camera is in use. Referring again to FIG. 4, it can be said that the outline of the handle 4 in storing position is complementary to the outline of the adjacent portion of the housing 1.

The surface 1a in the recess 5 of the housing 1 is further provided with a pair of terminals 12, 13 which are connected with conductors 14, 16. The conductor 14 is connected directly to one terminal of an electric motor 15 which can drive the shutter and the film transporting mechanism of the camera. The conductor 16 is connected with one contact of a master switch 17 which is installed adjacent to the front wall of the housing 1 and whose other contact is connected with the motor 15 by a further conductor 16a. The circuit of the motor 15 is completed in response to depression of a knob 17a which is accessible at the front side of the housing 1.

In order to enable the user to operate the camera when the handle 4 is attached in the storing position shown in FIG. 4, the surface 1b in the recess 5 is preferably provided with two additional terminals 18, 19, which are respectively connected in parallel with the terminals 12, 13. The front end face of the handle 4 is provided with terminals 8, 9 which respectively engage the terminals 12, 13 when the handle is in the operative position shown in FIG. 5. When the handle 4 is moved to the storing position shown in FIG. 4, the terminals 8, 9, respectively, engage the terminals 18, 19, i.e., the camera can be operated irrespective of the manner in which the handle 4 is attached to the housing 1. However, it is to be noted that the terminals 18, 19 constitute an optional feature of the camera because it normally suffices to provide the housing 1 with a single pair of terminals (12, 13). The motor 15 constitutes but one of several current-consuming units which can be installed in the housing 1 to receive energy from the cell 24 in the handle 4. For example, the cell 24 may supply current to an exposure meter in the housing 1, to a rewinding motor for film and/or to other current-consuming units.

The charging circuit for the cell 24 comprises a transformer 20 which is installed in the interior of the hollow handle 4 (FIG. 3) and whose primary circuit is connected with the prongs 6, 7. The secondary circuit of the transformer 20 contains two rectifier diodes 21, 22 and a capacitor 23 which is in parallel with the cell 24. The positive pole of the cell 24 is connected with the terminal 8 and its negative pole with the terminal 9.

The camera further comprises a locking device which serves to releasably hold the handle 4 in the storing position of FIG. 4 or in the operative position of FIG. 5. The locking device comprises a resilient locking member 25 which is mounted in the interior of the handle 4 and comprises a hooked end portion 26 adapted to engage one of two retaining members 27 provided in the surfaces 1a, 1b. These retaining members 27 are shown in FIG. 5. The actuating means for disengaging the end portion 26 from the adjoining retaining member 27 comprises a button 28 which extends from the handle 4 and can be depressed by a finger.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In a photographic camera, particularly in a motion picture camera, a combination comprising a housing; a hollow handle; a pair of electrical terminals extending from said handle, said terminals being insertable into a wall outlet; at least one rechargeable storage cell in said handle, said cell being electrically connected with said terminals so as to be charged when the terminals are inserted into the outlet; and a plurality of coupling means provided in said housing, said coupling means comprising first coupling means which receives said terminals in a first position of said handle with reference to said housing and second coupling means which receives said terminals in a different second position of said handle with reference to said housing.

2. A combination as defined in claim 1, wherein each of said coupling means comprises elastic sockets for said terminals.

3. In a photographic camera, particularly in a motion picture camera, a combination comprising a housing; a hollow handle; a pair of electrical terminals extending from said handle, said terminals being insertable into a wall outlet; at least one rechargeable storage cell in said handle, said cell being electrically connected with said terminals so as to be charged when the terminals are inserted into the outlet; and a plurality of coupling means provided in said housing and each adapted to receive said terminals in one of several positions of said handle with reference to said housing, said positions including a storing position in which the handle is located substantially within the confines of said housing.

4. In a photographic camera, particularly in a motion picture camera, a combination comprising a housing; an elongated hollow handle; a pair of electrical terminals extending from said handle, said terminals being insertable into a wall outlet; at least one rechargeable storage cell in said handle, said cell being electrically connected with said terminals so as to be charged when the terminals are inserted into the outlet; and a plurality of coupling means provided in said housing and each adapted to receive said terminals in one of several positions of said handle with reference to said housing, said housing having an elongated recess which accommodates the handle in one of said positions.

5. In a photographic camera, particularly in a motion picture camera, a combination comprising a housing; a hollow handle; a pair of electrical terminals extending from said handle, said terminals being insertable into a wall outlet; at least one rechargeable storage cell in said handle, said cell being electrically connected with said terminals so as to be charged when the terminals are inserted into the outlet; and a plurality of coupling means provided in said housing and each adapted to receive said terminals in one of several positions of said handle with reference to said housing, said positions including an operative position in which the handle extends from the housing and can be grasped by hand to thus serve as a support for said housing and a storing position in which the handle is located substantially within the confines of said housing.

6. In a photographic camera, particularly in a motion picture camera, a combination comprising a housing; a hollow handle; a first pair of electrical terminals extending from said handle, said terminals being insertable into a wall outlet; at least one rechargeable storage cell in said handle, said cell being electrically connected with said terminals so as to be charged when the terminals are inserted into the outlet; a second pair of electrical terminals provided on said handle and connected to said cell; a plurality of coupling means provided in said housing and each adapted to receive said terminals in one of several positions of said handle with reference to said housing, said housing comprising at least one third pair of terminals each of which engages with one of said second terminals in at least one position of said handle; at least one current-consuming unit provided in said housing and electrically connected with said third pair of terminals; and a charging circuit electrically connected between said first terminals and said cell.

7. In a photographic camera, particularly in a motion picture camera, a combination comprising a housing; a hollow handle; a pair of electrical terminals extending from said handle, said terminals being insertable into a wall outlet; at least one rechargeable storage cell in said handle, said cell being electrically connected with said terminals so as to be charged when the terminals are inserted into the outlet; a plurality of coupling means provided in said housing and each adapted to receive said terminals in one of several positions of said handle with reference to said housing; and manually operated locking means for releasably securing said handle to said housing in at least one of said positions, said locking means comprising a resilient locking member in said handle, a retaining member engaging said resilient locking member in said one position of the handle, and manually operated actuating means provided on said handle to disengage said resilient locking member from said retaining member at the will of the operator.

References Cited

FOREIGN PATENTS

| 1,263,782 | 5/1961 | France. |
| 1,070,283 | 12/1959 | Germany. |
| 1,074,973 | 2/1960 | Germany. |

JOHN M. HORAN, Primary Examiner

M. D. HARRIS, Assistant Examiner

U.S. Cl. X.R.

95—86; 240—10.6